June 28, 1960 J. P. GILLIAM 2,942,617
SLIP CHECK VALVE
Filed May 2, 1958

INVENTOR
JAMES PAUL GILLIAM

BY *James M. Drysdale*

ATTORNEY

United States Patent Office 2,942,617
Patented June 28, 1960

2,942,617

SLIP CHECK VALVE

James Paul Gilliam, R.F.D. 1, Box 596, De Land, Fla.

Filed May 2, 1958, Ser. No. 732,494

5 Claims. (Cl. 137—454.6)

This invention relates to check valves, that is to say, to valves for restricting flow of fluids to one direction in piping.

In order to insure that the force of gravity tends to urge the closure toward its seat without binding or sticking, the check valve must be installed in the piping with care and in the prescribed position if it is to be relied upon to perform properly and completely obstruct flow through the same in the desired direction.

This objective is attained in practice, as will be more fully disclosed hereinafter, through provision of a simplified check valve for which an ordinary one inch pipe line nipple can be utilized for the body; in which the closure is in the form of a disc like closure having a stem projecting therefrom surrounded by a coil spring urging the disc like closure toward the valve seat, the coil spring being constrained to limited axial movement by a cage like guide and stop; and which can be interposed in either vertical, horizontal or in any angular position in the piping.

Another object is attained in practice by the use of two plain inserts, a slip valve insert and a female insert whereby is produced a combination slip check and union.

Other objects with ancillary advantages will appear from the following detailed description of the attached drawings, wherein—

Figure 1:
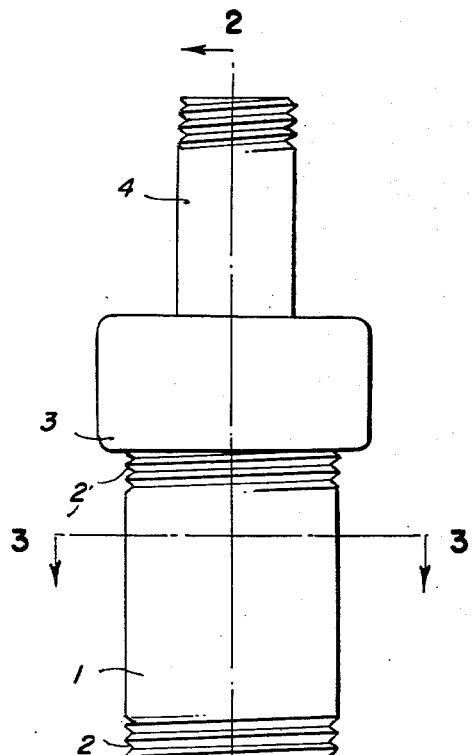
Fig. 1 is a side elevation of the check valve having utilized an ordinary one inch pipe line nipple for the body of the valve.
Figure 2:
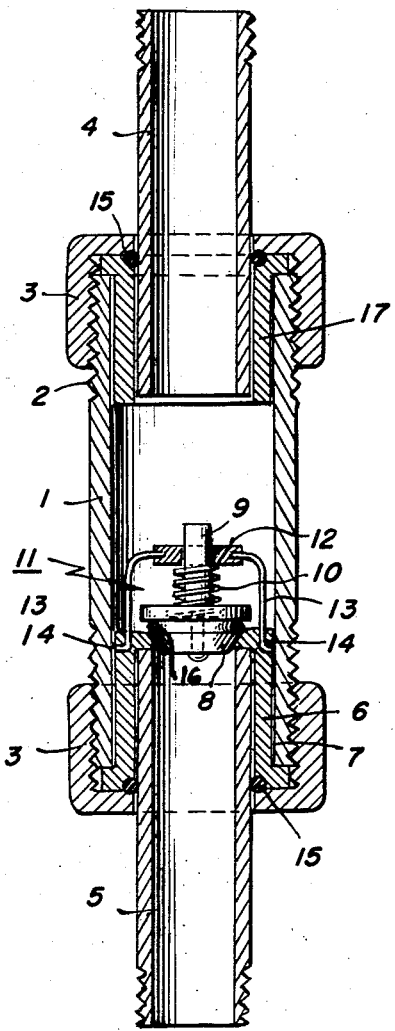
Fig. 2 is a sectional view of the check valve shown in Fig. 1 and showing in section the interior structure of the valve.
Figure 3:
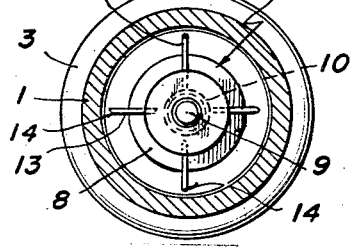
Fig. 3 is a view looking downwardly in the direction of the arrows along the line 3—3 passing through the center of the valve as shown in Fig. 1.

Referring now more particularly to the drawings wherein like numerals of reference designate the same parts in each of the figures, the numeral 1 designates a plain ordinary line one inch pipe nipple with screw threads 2 externally of its opposite ends for engagement with internally threaded bushings or slip rings 3 mounted one at each end of the nipple 1 and axially tapped for connection of pipe sections 4 and 5, which may be of standard ⅜" pipe.

In order to make possible the employment of such an ordinary pipe fitting for the purposes of a check valve, I have devised in accordance with my invention, an insert unit including a tubular part and seat member 6 which is force fitted into the annular recess 7 at the inner end of the lower bushing 3, and which extends somewhat beyond said recess interiorly of the nipple. Arranged to cooperate with the member 6 is a disk like closure 8 having a stem 9 projecting therefrom and surrounded by a coil spring 10 urging the disk like closure toward the valve seat, the coil spring 10 being constrained to limited axial movement by a cage like guide and stop 11.

This cage like guide and stop member may be called a guard 11 and has a round head 12 and four pendant legs 13, the foot portion of said legs fitting into suitable holes 14 in the upper face of the seat member 6 and preferably fixed rigidly to the upper edge of said seat member 6.

After the seat member is inserted into the one-inch pipe nipple, the standard ⅜ inch pipe 5 is inserted into the valve. This is then tightened with a threaded bushing or slip ring 3 and a rubber O-ring gasket 15.

On the opposite end of the pipe coupling 1, a standard insert or seat member 17 open on the end to permit the assembly to be slipped on the pipe 4 is fitted, thus completing the assembly.

The pipe 4 is also tightened with the upper slip ring 3 and another rubber O-ring gasket 15.

It will also be observed that there is also a rubber O-ring gasket 16 positioned below the disk like closure 8 and that below each O-ring gasket the metal of the closure members is grooved so that the rubber O-ring is snapped in this groove thus giving a positive retention thereof. Thus we see that after the slip valve is installed in the manner described above, water is permitted to flow in an upward direction the pressure of the water against the disk like closure 8 will raise the disk like closure and its stem 9 against the tension of the coil spring 10 which normally holds the valve closed and the water is permitted to flow freely in an upward direction.

It is obvious that by the above construction, the flow of the water can be only in one direction since if the water is cut off or reversed, the closure 8 is forced downward by means of the coil spring 10 which surrounds the stem 9.

The holes 14 in the upper face of the seat member 6 are of sufficient depth to rigidly hold the foot portions of the four pendant legs in position even when the disk like closure is in open position.

Dislodgment of the foot projections of the four pendant legs 13 of the guard 11 from the holes 14 in the upper face of the seat member 6 to which they are rigidly fixed cannot therefore occur after the seat member is incorporated within the coupling 1.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. The combination with a pipe having a nipple of larger diameter than said pipe, bushings having a cylindrical recess therein, a seat member within each recess and extending axially into said nipple, said bushings having means connecting the seat members with the nipple, one of said seat members having a flat annular end face comprising a valve seat, a disc-like closure mounted above the valve seat, an upright stem mounted on said closure, a coil spring surrounding the upright stem and urging the disc-like closure toward the valve seat, a guard constraining the stem to limited axial movement, said guard having a round head and four pendant legs, the feet portion of said legs being rigidly attached to the upper face of the seat member, and means connecting said seat members to said pipe.

2. A slip check valve as defined in claim 1, wherein said last named means comprises a rubber O-ring gasket positioned between each bushing and its seat member to provide a seal between the bushing, the seat member and the pipe as well as providing friction means to hold the pipe in assembled position.

3. In a check valve as defined in claim 1, wherein the disc-like closure mounted above the valve seat is provided with a groove, a rubber O-ring snapped into this groove thus giving a positive retention of the O-ring.

4. The combination of a pipe having a nipple of larger diameter than said pipe, bushings having a cylindrical recess therein, seat members clamped between the bushings and the nipple, one of said seat members having a flat annular end face comprising a valve seat, a disc-like closure mounted above the valve seat, an upright stem mounted on said closure, a coil spring surrounding the upright stem and urging the disc-like closure toward the valve seat, a guard constraining the stem to limited axial movement, said guard having a round head and four pendant legs, the foot portion of said legs attached rigidly to the upper face of the seat member, a rubber O-ring gasket positioned between each bushing and its seat member to provide a seal between the bushing, the seat member and the pipe as well as a friction means by which the pipe is held in assembled position.

5. In combination with a pipe, a nipple of larger diameter than said pipe, upper and lower bushings connected to said nipple, each bushing having a recess therein, a seat member within the recess of said lower bushing and extending axially into said nipple, said seat member having a flat annular end face comprising a valve seat, a disc-like closure mounted above the valve seat, an upright stem mounted on said closure, a coil spring surrounding the upright stem and urging the disc-like closure toward the valve seat, a guard constraining the stem to limited axial movement, said guard having a round head and four pendant legs, the ends of said legs being rigidly attached to the face of the seat member, another seat member within the recess of the upper bushing, means clamping each seat member between its bushing and the nipple and means connecting each seat member to the pipe.

References Cited in the file of this patent

UNITED STATES PATENTS

| | | |
|---|---|---|
| 2,327,600 | Kennon | Aug. 24, 1943 |
| 2,660,195 | Risley | Nov. 24, 1953 |

FOREIGN PATENTS

| | | |
|---|---|---|
| 481,703 | France | Oct. 13, 1916 |
| 153,605 | Australia | Oct. 13, 1953 |